(12) United States Patent  
Murayama et al.

(10) Patent No.: US 7,524,069 B2  
(45) Date of Patent: Apr. 28, 2009

(54) PROJECTOR WITH TRANSMITTER INFORMATION RECEIVER AND METHOD OF CORRECTING DISTORTION OF PROJECTED IMAGE

(75) Inventors: Syuuji Murayama, Tokyo (JP); Keiji Oura, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 649 days.

(21) Appl. No.: 11/329,225

(22) Filed: Jan. 11, 2006

(65) Prior Publication Data

US 2006/0183994 A1     Aug. 17, 2006

(30) Foreign Application Priority Data

Jan. 12, 2005   (JP) .............................. 2005-005282

(51) Int. Cl.
- G03B 21/14 (2006.01)
- G03B 21/00 (2006.01)
- G06K 9/40 (2006.01)
- G06K 9/03 (2006.01)
- G01S 15/89 (2006.01)
- H04N 5/33 (2006.01)

(52) U.S. Cl. ............... 353/69; 353/42; 353/121; 382/275; 382/309; 345/179; 348/163; 348/164

(58) Field of Classification Search ............... 353/69, 353/42, 121; 382/275, 309; 345/180, 179, 345/182; 348/163, 164, 177, 425.3
See application file for complete search history.

(56) References Cited

U.S. PATENT DOCUMENTS

| | | | |
|---|---|---|---|
| 7,180,510 B2 * | 2/2007 | Inoue et al. | 345/180 |
| 2005/0078279 A1 * | 4/2005 | Tamura | 353/42 |
| 2005/0083301 A1 * | 4/2005 | Tamura | 345/158 |

FOREIGN PATENT DOCUMENTS

| | | |
|---|---|---|
| JP | 2003-324669 | 11/2003 |
| JP | 2004-110797 | 4/2004 |

* cited by examiner

Primary Examiner—Diane I Lee  
Assistant Examiner—Magda Cruz  
(74) Attorney, Agent, or Firm—McGinn IP Law Group, PLLC

(57) ABSTRACT

A projector has a transmission time information reception unit for calculating the distances between a transmitter and first and second ultrasonic receivers based on reception times of ultrasonic and infrared pulses transmitted from a transmitter-equipped pointer rod for pointing to positions on a projection surface. The projector also has an image correcting information calculation unit, which, when a test pattern made up of a plurality of reference points including a plurality of points near the corners of the upper and lower edges of the projection surface is projected onto the projection surface, generates a coordinate transformation table to bring the coordinates of the reference points near the upper edge into conformity with the coordinates of corresponding desired corrective points, from the distance information acquired by the transmission time information reception unit through the transmitter-equipped pointer rod and positional information of the desired corrective points.

11 Claims, 7 Drawing Sheets

PROJECTOR WITH TRANSMITTER INFORMATION RECEIVER AND METHOD OF CORRECTING DISTORTION OF PROJECTED IMAGE

BACKGROUND OF THE INVENTION

1. Field of the Invention

The present invention relates to a projector and a method of correcting the distortion of a projected image, and more particularly to a projector having a transmitter information receiver for utilizing information from a transmitter which has an ultrasonic transmission unit and an infrared emission unit, and a method of correcting the distortion of an image projected by such a projector.

2. Description of the Related Art

In recent years, efforts that have been made to shorten the focal length of projectors have resulted in a growing number of projectors available for projecting images over short distances. Greater focal length reductions have also been achieved by projectors having a projecting mirror disposed in a housing which has an open structure.

Images projected by short-focal-length projectors tend to suffer a very large distortion even if the screen is only slightly distorted or twisted. Such a very large distortion is caused because the distance between the projector and the screen is so small that the ratio of the screen distortion or twist to the distance is unduly large. Various difficulties have been experienced in manually adjusting installed projectors to correct image distortions.

JP-A-2003-324669 discloses a correcting process employing a mechanical tilt sensor mechanism for improving the adjustment of an installed projector. It has also been proposed to install a signal source for supplying positional information on a screen or to electrically detect the tilt of a projector itself to correct the tilt.

According to the correcting process disclosed in JP-A-2003-324669, the projector needs to have a space therein for mounting a tilt sensor therein. The disclosed process is unable to correct an image distortion due to the distortion or a twist of the screen itself. The signal source mounted on the screen for supplying positional information or the electrical detection of the tilt of the projector itself to correct the tilt has suffered a low accuracy of corrected images and can only be used with a limited range of projectors and screens.

SUMMARY OF THE INVENTION

It is an object of the present invention to provide a projector which is capable of correcting the distortion of a projected image without the need for alterations on a screen or a tilt detecting mechanism on the projector.

A projector having a transmitter information receiver according to the present invention is used in combination with a transmitter having an ultrasonic transmission unit for transmitting an ultrasonic wave and an infrared transmission unit for emitting infrared radiation.

The projector has an infrared detector, and a first ultrasonic receiver and a second ultrasonic receiver which are spaced from each other, a transmission time information reception unit, and an image correcting information calculation unit.

The transmission time information reception unit calculates the distance between the transmitter and the first ultrasonic receiver and the distance between the transmitter and the second ultrasonic receiver based on the reception times of the ultrasonic wave and the infrared radiation transmitted by the transmitter which points to a position on a projection surface, and stores the calculated distances as distance information.

A test pattern made up of a plurality of reference points including a plurality of points near corners of upper and lower edges of the projection surface is projected onto the projection surface. Based on the distance information on the projection surface which is acquired by the transmission time information reception unit through the transmitter with respect to the reference points projected onto the projection surface and positional information of desired corrective points for the reference points including points near the corner of the upper edge, which is also acquired by the transmission time information reception unit through the transmitter, the image correcting information calculation unit generates a coordinate transformation table for bringing the coordinates of the reference points near the upper edge into conformity with the coordinates of the desired corrective points corresponding thereto.

The desired corrective points for the reference points may be calculated as desired positions on the projection surface based on the coordinates of the reference points near the corners of a lower edge of the test pattern on the projection surface, from the positional relationship between the coordinates of the reference points near the corners of the lower edge of the test pattern and the coordinates of the reference points near corners of an upper lower edge of the test pattern. Alternatively, the desired corrective points for the reference points may be calculated from the distance information on the projection surface of the desired corrective points for the reference points which are acquired by the transmission time information reception unit through the transmitter, and the distance information of the reference points near the corners of the lower edge of the projection surface.

The points near the corners of the upper edge of the projection surface may comprise two points near the corners of the upper edge of the projection surface. The projector may further comprise a pointer rod for pointing the position on the projection surface, the transmitter being mounted on the pointer rod near a tip end thereof. The projector may be a mirror-type projector having a housing having an open structure and a projection mirror for projecting an image, the projection mirror being disposed in the housing.

The transmission time information reception unit has, in addition to the first ultrasonic receiver and the second ultrasonic receiver and the infrared detector, a time difference analysis distance calculator and a transmitter distance information storage. The time difference analysis distance calculator calculates ultrasonic wave arrival times from the ultrasonic transmission unit to the first ultrasonic receiver and the second ultrasonic receiver from the differences between a detection time at the infrared detector and the reception times at the first ultrasonic receiver and the second ultrasonic receiver, and then calculates distances from the ultrasonic transmission unit to the first ultrasonic receiver and the second ultrasonic receiver from the ultrasonic wave arrival times. The transmitter distance information storage stores distance information representing the calculated distances in a predetermined order.

The image correcting information calculation unit has a test pattern generator, a lower reference point distance acquisition unit, an upper reference point distance acquisition unit, an upper corrective point coordinate calculator, and a coordinate transformation table generator.

The test pattern generator projects the test pattern made up of the reference points including the points near the corners of the upper and lower edges of the projection surface, onto the projection surface. The lower reference point distance acquisition unit calculates deemed vertical distances between a line interconnecting the first ultrasonic receiver and the second ultrasonic receiver and the lower two reference points on the assumption that the lower two reference points are disposed on a plane containing the first ultrasonic receiver and the second ultrasonic receiver and extending parallel to a projection optical axis, from distance information of the lower two reference points which is stored in the transmitter distance information storage and the distance between the first ultrasonic receiver and from the second ultrasonic receiver. The upper reference point coordinate acquisition unit calculates vertical and horizontal coordinates of upper ones of the reference points on a plane perpendicular to the projection optical axis from the distance between the first ultrasonic receiver and the second ultrasonic receiver and from distance information of the upper reference points which is stored in the transmitter distance information storage, on the assumption that vertical distances between a plane containing the first ultrasonic receiver and the second ultrasonic receiver and extending perpendicular to the projection optical axis and to the reference points near the upper edge of the projection surface are substantially equal to the deemed vertical distances. The upper corrective point coordinate calculator calculates coordinates of desired corrective points for the upper reference points according to a predetermined process. The coordinate transformation table generator generates the coordinate transformation table for bringing the coordinates of the upper reference points which are calculated by the upper reference point distance acquisition unit into conformity with the coordinates of the desired corrective points for the upper reference points which are calculated by the upper corrective point coordinate calculator.

According to the present invention, there is also provided a method of correcting a distortion of an image projected by a projector having a transmitter information receiver. The method comprises the steps of:

projecting a test pattern made up of a plurality of reference points including a plurality of points near the corners of upper and lower edges of a projection surface, from a test pattern generator onto the projection surface;

pointing to the reference points of the test pattern projected onto the projection surface in a predetermined order with a transmitter having an ultrasonic transmission unit for transmitting an ultrasonic wave and with an infrared transmission unit for emitting an infrared radiation, to simultaneously transmit ultrasonic and infrared pulses, representing time information, from the ultrasonic transmission unit and the infrared transmission unit;

receiving the ultrasonic and infrared pulses with a first ultrasonic receiver and a second ultrasonic receiver and an infrared detector of the projector, acquiring time differences between reception times of the ultrasonic pulses and a reception time of the infrared pulse, and calculating a distance between the ultrasonic transmission unit and the first ultrasonic receiver and a distance between the ultrasonic transmission unit and the second ultrasonic receiver from the acquired time differences;

storing the calculated distances in a transmitter distance information storage in a predetermined order;

controlling a lower reference point distance acquisition unit to calculate deemed vertical distances between a line interconnecting the first ultrasonic receiver and the second ultrasonic receiver and the lower two reference points on the assumption that the lower two reference points are disposed on a plane containing the first ultrasonic receiver and the second ultrasonic receiver and extending parallel to a projection optical axis, from distance information of the lower two reference points which is stored in the transmitter distance information storage and from the distance between the first ultrasonic receiver and the second ultrasonic receiver;

controlling an upper reference point coordinate acquisition unit to calculate vertical and horizontal coordinates of upper ones of the reference points on a plane perpendicular to the projection optical axis from the distance between the first ultrasonic receiver and the second ultrasonic receiver and from distance information of the upper reference points which is stored in the transmitter distance information storage, on the assumption that vertical distances between a plane containing the first ultrasonic receiver and the second ultrasonic receiver and extending perpendicular to the projection optical axis and to the reference points near the upper edge of the projection surface are substantially equal to the deemed vertical distances;

controlling an upper corrective point coordinate calculator to assume that the vertical distances between the plane containing the first ultrasonic receiver and the second ultrasonic receiver and extending perpendicular to the projection optical axis and to the reference points near the upper edge of the projection surface are substantially equal to the deemed vertical distances, to calculate coordinates of the lower two reference points on the assumption that the lower two reference points are disposed on the plane containing the first ultrasonic receiver and the second ultrasonic receiver and extending parallel to the projection optical axis, from the distance information of the lower two reference points which is stored in the transmitter distance information storage and from the distance between the first ultrasonic receiver and the second ultrasonic receiver, and to calculate the coordinates of upper one of the reference points of the test pattern as the upper ones of the desired corrective points on the assumption that the coordinates of the lower two reference points correspond to the coordinates of the lower two of the reference points of the test pattern;

controlling a coordinate transformation table generator to generate a coordinate transformation table for bringing the coordinates of the upper reference points which are calculated by the upper reference point distance acquisition unit into conformity with the coordinates of the desired corrective points for the upper reference points which are calculated by the upper corrective point coordinate calculator; and controlling an image controller to correct an input original image based on the coordinate transformation table and project the corrected image from a projecting device onto the projection surface.

The projector with the transmitter information receiver is combined with the transmitter which has the ultrasonic transmission unit for transmitting an ultrasonic wave and the infrared transmission unit for emitting an infrared radiation, for acquiring reference points projected onto the projection surface or the positional information of corrective points with the transmitter. The projector is capable of generating a coordinate transformation table for bringing the reference points into positional conformity with corrective points therefor. The positions of the reference points can easily be acquired if the transmitter is mounted on the tip end of a pointer rod.

According to the present invention, when the projector with the transmitter information receiver is combined with the transmitter which has the ultrasonic transmission unit for transmitting an ultrasonic wave and the infrared transmission unit for emitting an infrared radiation, distortion information of projected images can be acquired. Distortions of projected images which are caused by distortions of a projection screen can be corrected without the need for alterations on the projection screen.

Since necessary points on the projection screen are merely pointed by the transmitter to transmit their positional information, it is easy to increase the number of reference points used and corrective points therefor, and image distortions can accurately be corrected using the reference points and the corrective points therefor.

The above and other objects, features, and advantages of the present invention will become apparent from the following description with reference to the accompanying drawings which illustrate examples of preferred embodiments of the present invention.

DETAILED DESCRIPTION OF THE PREFERRED EMBODIMENTS

Figure 1:
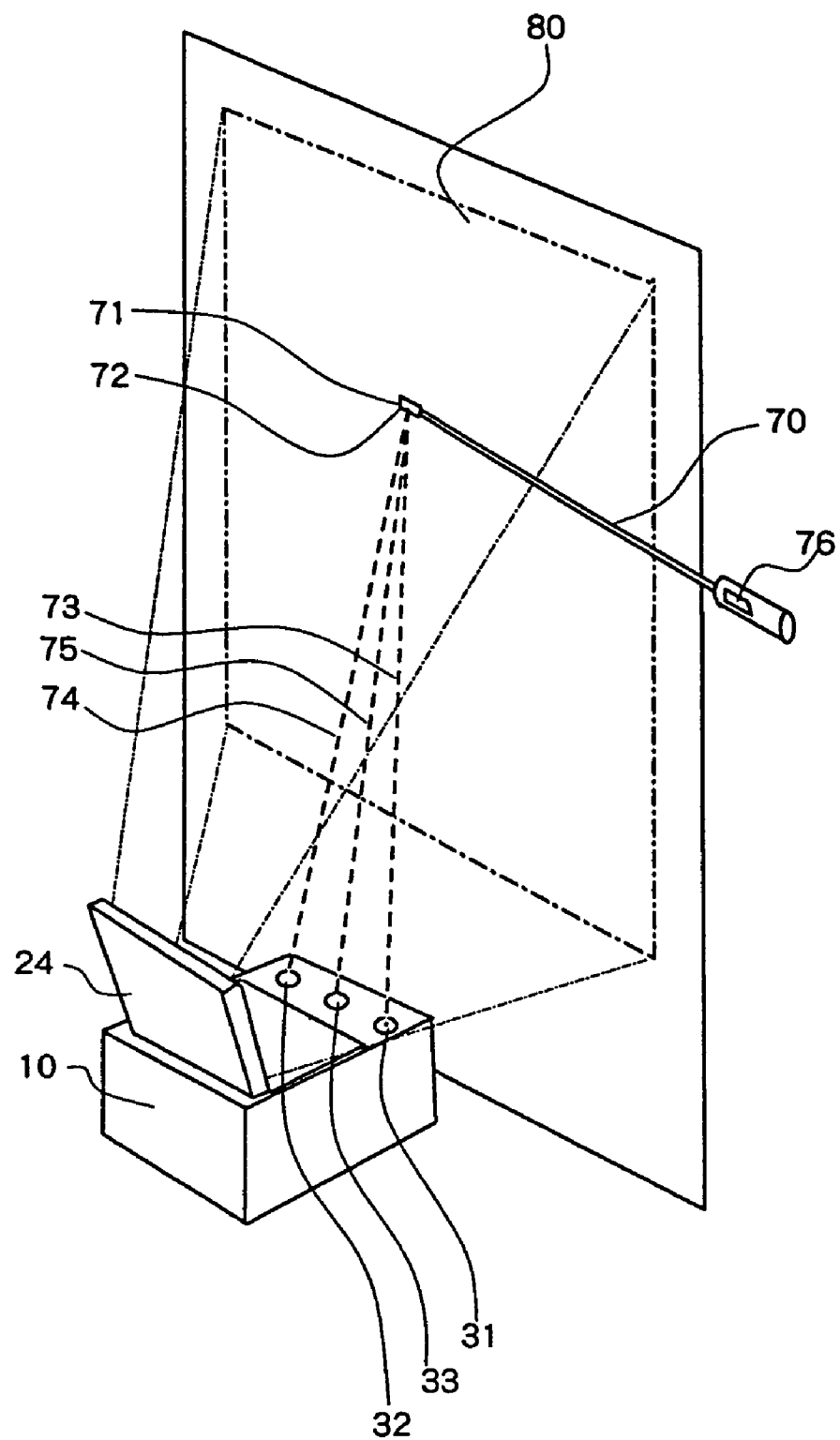
FIG. 1 is a perspective view showing the relationship between a projector having a transmitter information receiver according to an embodiment of the present invention, a transmitter-equipped pointer rod, and a projection surface.

The present invention will be described below with reference to the drawings. According to the present invention, as shown in FIG. 1, a distortion of an image projected onto projection surface 80, which is produced by a distortion or twist of projection surface 80, is corrected using a transmitter having ultrasonic transmission unit 71 for transmitting an ultrasonic wave and infrared transmission unit 72 for emitting an infrared radiation. According to the present invention, the transmitter is mounted on the tip end of a pointer rod. The pointer rod will be referred to as transmitter-equipped pointer rod 70. However, the transmitter is not limited to being mounted on a pointer rod, but may be of any structure insofar as it can be moved to any position on the projection surface and can emit an infrared radiation and transmit an ultrasonic wave.

According to the present invention, a coordinate transformation table is generated for bringing the coordinates of a plurality of reference points on projection surface 80, which include both corners near an upper edge of a test pattern projected onto projection surface 80, into conformity with the coordinates of desired corrective points. An original image projected onto projection surface 80 is corrected by the coordinate transformation table so that a distortion-free image is projected onto projection surface 80. The coordinates of corrective points are acquired differently according to a first embodiment and a second embodiment. According to the first embodiment, the coordinates of reference points 91, 92 (see FIG. 3) on projection surface 80 near opposite lower corners thereof are assumed to correspond respectively to reference points near a lower edge of a test pattern projected onto projection surface 80, and the coordinates on projection surface 80 of a reference point on an upper edge of the test pattern are calculated as the coordinates of a corrective point. According to the second embodiment, the position of a corrective point on projection surface 80 is pointed by transmitter-equipped pointer rod 70 to directly acquire the coordinates of the corrective point.

Other details of the first and second embodiments are common. The first and second embodiments will be described below separately with respect to the acquisition of the coordinates of a corrective point in the description, which follows, of the common details of the first and second embodiments.

According to the first embodiment, a reference point projected onto projection surface 80 is pointed by transmitter-equipped pointer rod 70, and the transmitter thereof is energized to determine the distances from the transmitter to two ultrasonic reception units 31, 32. Then, the coordinates of reference points 91, 92 on projection surface 80 near the opposite lower corners thereof are assumed to correspond respectively to the reference points near the lower edge of the test pattern projected onto projection surface 80, and desired coordinates of the reference point near the upper edge of the test pattern are calculated. Thereafter, a coordinate transformation table is generated for correcting the coordinates of the projected reference point into the desired coordinates. An original image projected onto projection surface 80 is corrected by the coordinate transformation table so that a distortion-free image is projected onto projection surface 80.

According to the second embodiment, a reference point projected onto projection surface 80 and a corrective point for the reference point are pointed by transmitter-equipped pointer rod 70, and the transmitter thereof is energized to determine the distances from the transmitter to two ultrasonic reception units 31, 32. Then, the coordinates of the given reference point projected onto projection surface 80 and the coordinates of a corrective point for the reference point are calculated based on the determined distances, and a coordinate transformation table is generated for correcting the coordinates of the given reference point into the coordinates of the corrective point. An original image projected onto projection surface 80 is corrected by the coordinate transformation table so that a distortion-free image is projected onto projection surface 80.

Figure 2:
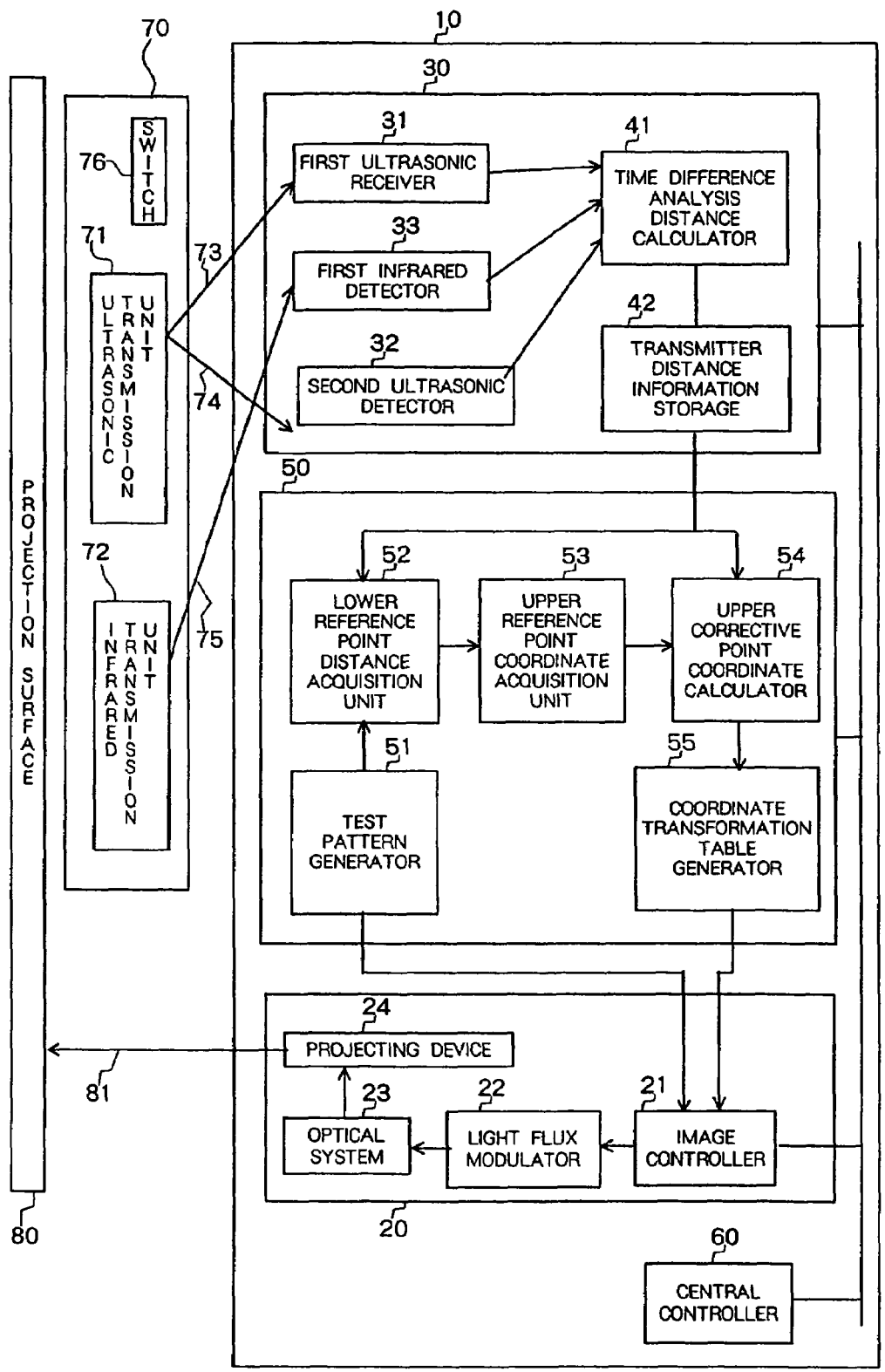
FIG. 2 is a block diagram of the projector having the transmitter information receiver according to the embodiment of the present invention.

Structural and functional details of projector 10 having a transmitter information receiver, transmitter-equipped pointer rod 70, and projection surface 80 according to the present invention will be described below with reference to FIGS. 1 and 2. As shown in FIG. 2, transmitter-equipped pointer rod 70 is structurally identical to an electronic digital pen for use on an electronic blackboard. Transmitter-equipped pointer rod 70 comprises a transmitter having ultrasonic transmission unit 71 for transmitting an ultrasonic wave for positional detection and infrared transmission unit 72 for emitting an infrared radiation as a trigger pulse, the transmitter being mounted on the tip end of a pointer rod.

Ultrasonic transmission unit 71 and infrared transmission unit 72 emit an ultrasonic signal and an infrared pulse once in a period in synchronism with each other. Ultrasonic transmission unit 71 and infrared transmission unit 72 can be turned on and off by switch 76 on a grip of transmitter-equipped pointer rod 70.

As shown in FIG. 2, projector 10 comprises transmission time information reception unit 30, image correcting information calculation unit 50, projection unit 20, and central controller 60 for controlling these components.

Transmission time information reception unit 30 has first ultrasonic receiver 31, second ultrasonic receiver 32, infrared detector 33, time difference analysis distance calculator 41, and transmitter distance information storage 42.

First ultrasonic receiver 31 and second ultrasonic receiver 32 are horizontally spaced from each other on a vertical plane which extends perpendicularly to projection optical axis 81 of projector 10. First ultrasonic receiver 31 and second ultrasonic receiver 32 receive respective ultrasonic signals 73, 74 that are generated by ultrasonic transmission unit 71 of transmitter-equipped pointer rod 70. Infrared detector 33 is disposed in the vicinity of first ultrasonic receiver 31 and second ultrasonic receiver 32, and detects infrared pulse 75 emitted from infrared transmission unit 72 of transmitter-equipped pointer rod 70.

Ultrasonic transmission unit 71 of transmitter-equipped pointer rod 70 generate an ultrasonic signal and an infrared pulse once in a period in synchronism with each other. Time difference analysis distance calculator 41 determines the difference between the time when infrared detector 33 detects infrared pulse 75 and the time when first ultrasonic receiver 31 receives ultrasonic signal 73, and also determines the difference between the time when infrared detector 33 detects infrared pulse 75 and the time when second ultrasonic receiver 32 receives ultrasonic signal 74. Based on the determined time difference, time difference analysis distance calculator 41 calculates the ultrasonic wave arrival time from ultrasonic transmission unit 71 to first ultrasonic receiver 31 and the ultrasonic wave arrival time from ultrasonic transmission unit 71 to second ultrasonic receiver 32. By converting the times using the speed of sound, time difference analysis distance calculator 41 can calculate the distance from ultrasonic transmission unit 71 to first ultrasonic receiver 31 and the distance from ultrasonic transmission unit 71 to second ultrasonic receiver 32.

The calculated distances are stored in transmitter distance information storage 42 in a predetermined order for readout in the future, e.g., in the order in which they are received by transmitter distance information storage 42.

Image correcting information calculation unit 50 has test pattern generator 51, lower reference point distance acquisition unit 52, upper reference point coordinate acquisition unit 53, upper corrective point coordinate calculator 54, and coordinate transformation table generator 55.

Test pattern generator 51 controls projection unit 20 to project a test pattern made up of a plurality of points serving as reference points, including a plurality of points near the corners of upper and lower edges of projection surface 80, onto projection surface 80.

According to the first embodiment, an image projected onto projection surface 80 is corrected as follows: A reference point projected onto projection surface 80 near the upper edge of projection surface 80 is pointed by transmitter-equipped pointer rod 70, and the transmitter thereof is energized to determine the coordinates of the reference point. Then, the coordinates of reference points 91, 92 projected onto projection surface 80 near the opposite lower corners thereof are assumed to correspond respectively to the reference points near the lower edge of the test pattern projected onto projection surface 80, and correct coordinates of the reference point near the upper edge of the test pattern are calculated. The calculated coordinates are used as the coordinates of a desired corrective point, and the coordinates of the reference point projected onto projection surface 80 near the upper edge thereof are corrected into the coordinates of the desired corrective point, thereby correcting the projected image.

According to the second embodiment, the reference point projected onto projection surface 80 near the upper edge thereof is pointed by transmitter-equipped pointer rod 70, and the transmitter thereof is energized to determine the coordinates of the reference point. Then, a desired corrective point for the reference point on projection surface 80 is pointed by transmitter-equipped pointer rod 70, and the transmitter is energized to determine the coordinates of the corrective point.

The reference points including points near the corners of the upper edge of projection surface 80 may comprise only two reference points near the corners for correcting projected images. It is assumed, therefore, that projected images will be corrected using only two reference points near the corners of the upper edge of projection surface 80. However, more reference points including points near the corners of the upper edge of projection surface 80 enable projector 10 to correct image distortions more accurately. The number of reference points to be used can easily be increased because the reference point on projection surface 80 may only be pointed by transmitter-equipped pointer rod 70 according to the first embodiment and the reference point on projection surface 80 and the corrective point for the reference point may only be pointed by transmitter-equipped pointer rod 70 according to the second embodiment. The correcting operation will be described in detail later on with reference to FIG. 3.

In the correcting operation, the reference points projected onto projection surface 80 near the lower opposite corners thereof are used as reference positions for correction, and the positions of a plurality of reference points including points near the corners of the upper edge of projection surface 80 are corrected. First, the distances from the lower reference points on projection surface 30 to first ultrasonic receiver 31 and second ultrasonic receiver 32 are acquired. As described later on, it is assumed that the lower reference points are located on a plane containing first ultrasonic receiver 31 and second ultrasonic receiver 32 and extending parallel to projection optical axis 81.

Lower reference point distance acquisition unit 52 determines the distance information of the lower two reference points which is stored in transmitter distance information storage 42 and the distance between first ultrasonic receiver 31 and second ultrasonic receiver 32 which is stored in transmitter distance information storage 42. It is assumed that the lower two reference points are located on a plane containing first ultrasonic receiver 31 and second ultrasonic receiver 32 and extending parallel to projection optical axis 81. Then, deemed vertical distances between a line interconnecting first ultrasonic receiver 31 and second ultrasonic receiver 32 and the respective lower two reference points are calculated. A process of calculating the deemed vertical distances using the distance information of the lower two reference points and the distance between first ultrasonic receiver 31 and second ultrasonic receiver 32 will be described later on. With short-focal-length projectors such as mirror-type projectors, projecting device 24 of projection unit 20 is often disposed in a low position. Therefore, the difference between the deemed vertical distances and actual vertical distances is small, and no large error is produced by corrections based on the deemed vertical distances.

Upper reference point coordinate acquisition unit 53 assumes that the vertical distance between a plane containing first ultrasonic receiver 31 and second ultrasonic receiver 32 and extending perpendicular to projection optical axis 81 and the reference points near the upper edge of projection surface 80 is equal to the previously calculated deemed vertical distance. Based on the distance between first ultrasonic receiver 31 and second ultrasonic receiver 32 and the distance information of the upper reference points which is stored in transmitter distance information storage 42, upper reference point coordinate acquisition unit 53 calculates vertical and horizontal coordinates of the upper reference points on the plane perpendicular to projection optical axis 81. The principles of calculation of the coordinates will be described later on. If projecting surface 80 is tilted forward or backward, then the vertical distance between the plane containing first ultrasonic receiver 31 and second ultrasonic receiver 32 and extending perpendicular to projection optical axis 81 changes vertically. However, since the difference between those vertical distances is small compared with the vertical length of projection surface 80, no large error is caused even if the vertical distances are regarded as being equal to each other.

According to the first embodiment, upper corrective point coordinate calculator 54 assumes that the vertical distance between the plane containing first ultrasonic receiver 31 and second ultrasonic receiver 32 and extending perpendicular to projection optical axis 81 and the reference points near the upper edge of projection surface 80 is equal to the deemed vertical distance. Based on the distance information of lower reference points 91, 92 which is stored in transmitter distance information storage 42 and the distance between first ultrasonic receiver 31 and second ultrasonic receiver 32, upper corrective point coordinate calculator 54 calculates the coordinates of lower reference points 91, 92 on the assumption that lower reference points 91, 92 are located on the plane containing first ultrasonic receiver 31 and second ultrasonic receiver 32 and extending parallel to projection optical axis 81. Upper corrective point coordinate calculator 54 calculates the coordinates on projection surface 80 of the reference points near the upper edge of the test pattern on the assumption that the coordinates of lower two reference points 91, 92 on projection surface 80 correspond to the coordinates of the lower two reference points near the lower edge of the test pattern.

According to the second embodiment, upper corrective point coordinate calculator 54 assumes that the vertical distance between the plane containing first ultrasonic receiver 31 and second ultrasonic receiver 32 and extending perpendicular to projection optical axis 81 and the reference points near the upper edge of projection surface 80 is equal to the deemed vertical distance. Based on the distance between first ultrasonic receiver 31 and second ultrasonic receiver 32 and the distance information of corrective points for the upper reference points which is stored in transmitter distance information storage 42, upper corrective point coordinate calculator 54 calculates vertical and horizontal coordinates of the desired corrective points on the plane perpendicular to projection optical axis 81. The principles of calculation of the coordinates will be described later on.

Coordinate transformation table generator 55 generates a coordinate transformation table for bringing the coordinates of the upper reference points which have been calculated by upper reference point coordinate acquisition unit 53 into conformity with the coordinates of the corresponding desired upper corrective points which have been calculated by upper corrective point coordinate calculator 54.

Projection unit 20 has image controller 21, light flux modulator 22, optical system 23, and projecting device 24. Image controller 21 inversely corrects an original image with the coordinate transformation table generated by coordinate transformation table generator 55, and sends the corrected image to light flux modulator 22. Light flux modulator 22 modulates a light flux with the corrected image from image controller 21. The modulated light flux is supplied as representing a distortion-free image through optical system 23 to projecting device 24, which projects the image onto projection surface 80. Light flux modulator 22 may comprise a DLP display unit comprising DMDs (Digital Mirror Devices) or a liquid crystal display unit.

Figure 3:
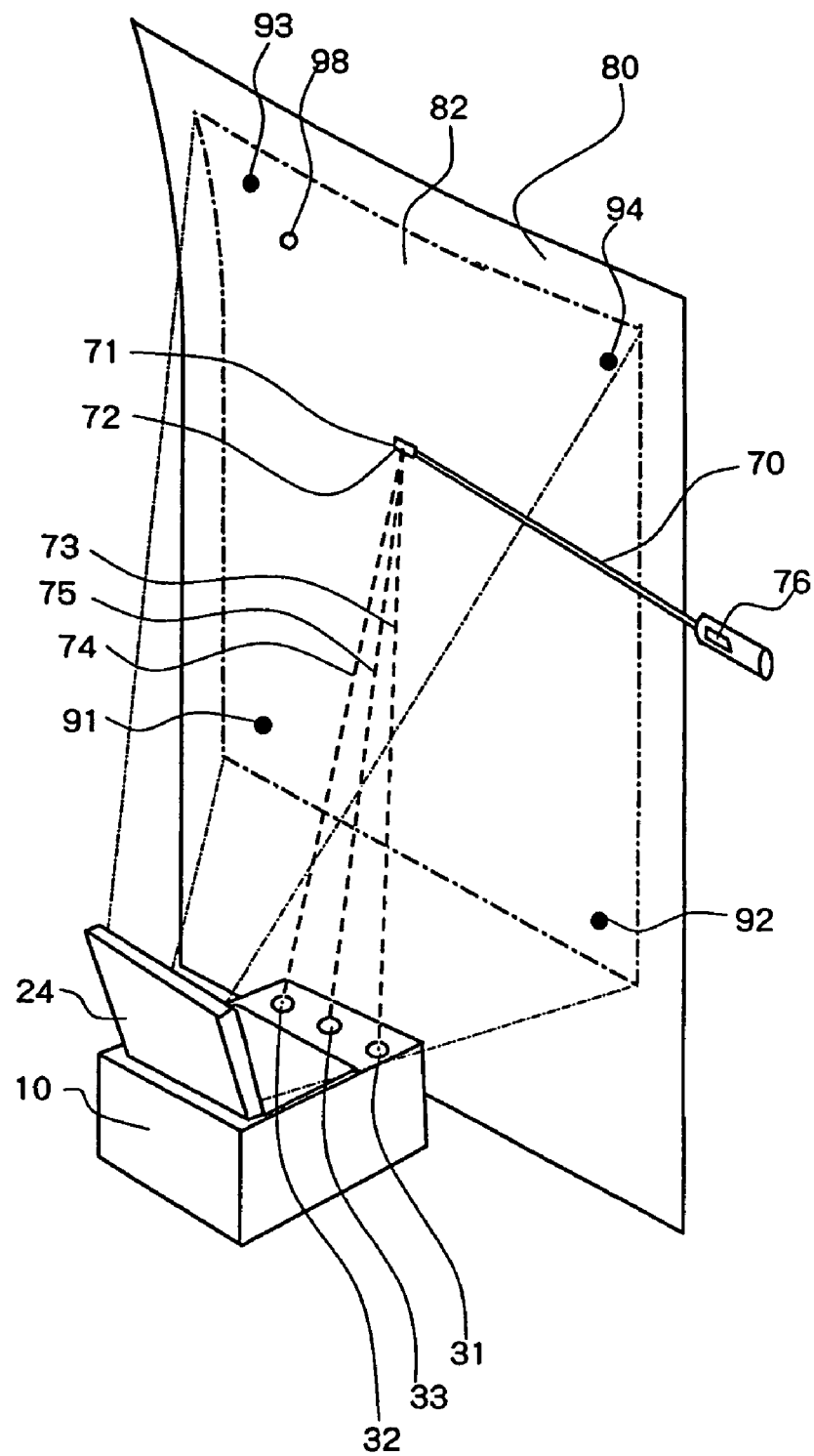
FIG. 3 is a perspective view showing the relationship between the projector having the transmitter information receiver, reference points on the projection surface, and a corrective point for a reference point.

The correcting operation will be described in further detail with reference to FIG. 3. Image 82 it projected onto projection surface 80 which has a small distortion in its upper left area. Therefore, projected image 82 also has a small distortion in its upper left area as shown in FIG. 3. Of lower left and right and upper left and right reference points 91, 92, 93, 94 that are projected onto the respective vertexes of projected image 82 which is of an elongate rectangular shape, upper left reference point 93 on projection surface 80 should desirably be positioned as upper left desired corrective point 98. For the sake of brevity, only upper left reference point 93 will be corrected below. However, upper right reference point 94 or any intermediate reference points may similarly be corrected.

According to the first embodiment, the coordinates of upper left desired corrective point 98 for upper left reference point 93 on projection surface 80 are calculated as the coordinates of the upper left reference point on projection surface 80 which have been calculated on the assumption that the coordinates of lower two reference points 91, 92 correspond to the lower two reference points of the test pattern.

The reference points are successively pointed in a given order by the transmitter of transmitter-equipped pointer rod 70, and the transmitter thereof is energized to transmit the information of the reference points. The given order serves to designate storage addresses in transmitter distance information storage 42. For example, lower left reference point 91, lower right reference point 92, upper left reference point 93, and following upper right reference points are successively pointed and their information is transmitted in the order named. Time difference analysis distance calculator 41 calculates the distance information of the reference points, which are stored in transmitter distance information storage 42 in the given order.

The stored distance information is then read by image correcting information calculation unit 50. Image correcting information calculation unit 50 determines the coordinates of the reference points in a given order, and generates a coordinate transformation table having such weighted coordinates that the upper left reference point 93 is corrected into upper left desired corrective point 98.

According to the second embodiment, a desired corrective point is set as a reference point that is visually recognized as a desired reference point.

The reference points and the desired corrective point are successively pointed in a given order by the transmitter of transmitter-equipped pointer rod 70, and the transmitter thereof is energized to transmit the information of the reference points. The given order serves to designate storage addresses in transmitter distance information storage 42. For example, lower left reference point 91, lower right reference point 92, upper left reference point 93, upper left desired corrective point 98, upper right reference point 94, and a desired corrective point for upper right reference point 94 are successively pointed and their information is transmitted in the order named. In FIG. 3, upper right reference point 94 is pointed following upper left desired corrective point 98. Since upper right reference point 94 does not need to be corrected, it is pointed again and its information is transmitted. The distance information of the reference points and the desired corrective point is calculated by time difference analysis distance calculator 41, and stored in transmitter distance information storage 42 in the given order.

The stored distance information is then read by image correcting information calculation unit 50. Image correcting information calculation unit 50 determines the coordinates of the reference points and the desired corrective points in a given order, and generates a coordinate transformation table having such weighted coordinates that the upper left reference point 93 is corrected into upper left desired corrective point 98.

Figure 4:
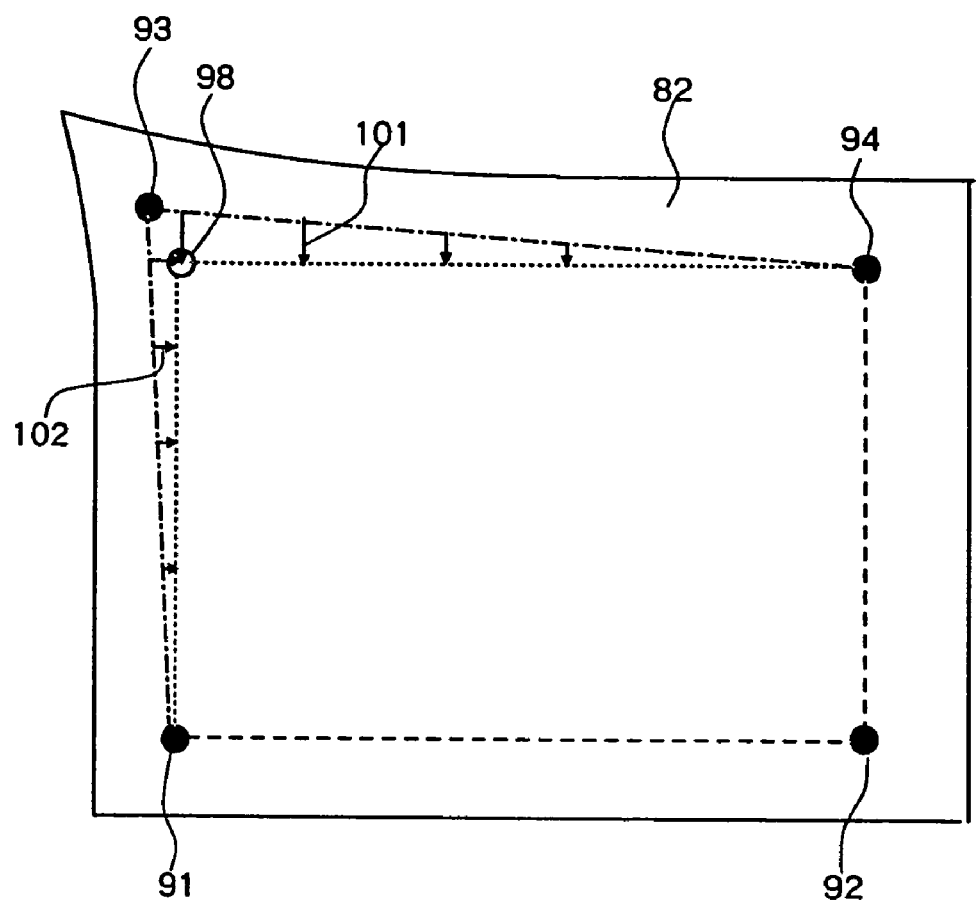
FIG. 4 is a view illustrative of a process for generating a corrected image from an original image based on coordinate information.

A process of generating a corrected image from an original image based on coordinate information will be described below with reference to FIGS. 3 and 4. FIG. 4 schematically shows such a process for generating a corrected image from an original image based on coordinate information. Image 82 projected onto projection surface 80 has a distortion due to the distortion projection surface 80, as shown in FIG. 3.

According to the first embodiment, the coordinates of reference points 91, 92, 93, 94 on projected image 82 are acquired using transmitter-equipped pointer rod 70. The coordinates of upper left desired corrective point 98 are calculated based on lower left reference point 91 and lower right reference point 92 from the positional relationship between the reference points of the test pattern, as described above.

According to the second embodiment, the coordinates of reference points 91, 92, 93, desired corrective point 98, and reference point 94 are acquired using transmitter-equipped pointer rod 70.

From the acquired coordinates, there is generated a coordinate transformation table having weighted horizontal and vertical corrective quantities 101, 102 for correcting distorted upper left reference point 93 into upper left desired corrective point 98. Using the generated coordinate transformation table, the pixels of the original image are converted into the pixels of the corrected image, which is projected as a distortion-free image onto distorted projection surface 80. If many reference points are provided near the upper edge of the projected image, then it is possible to acquire the coordinates of more correct desired corrective points for more accurate image correction.

For the sake of brevity, the correction of the upper left reference point has been described above. Even if an increased number of reference points on a test pattern projected onto the projection surface are employed, they can similarly be corrected for more accurate image correction. Reference points may be projected not only along the upper edge, but also along the left edge and/or the right edge, and desired corrective points may be given in combination with those reference points for more accurate image correction.

A process of acquiring the distance information will be described in detail below with reference to FIGS. 5 and 6.

Figure 5:
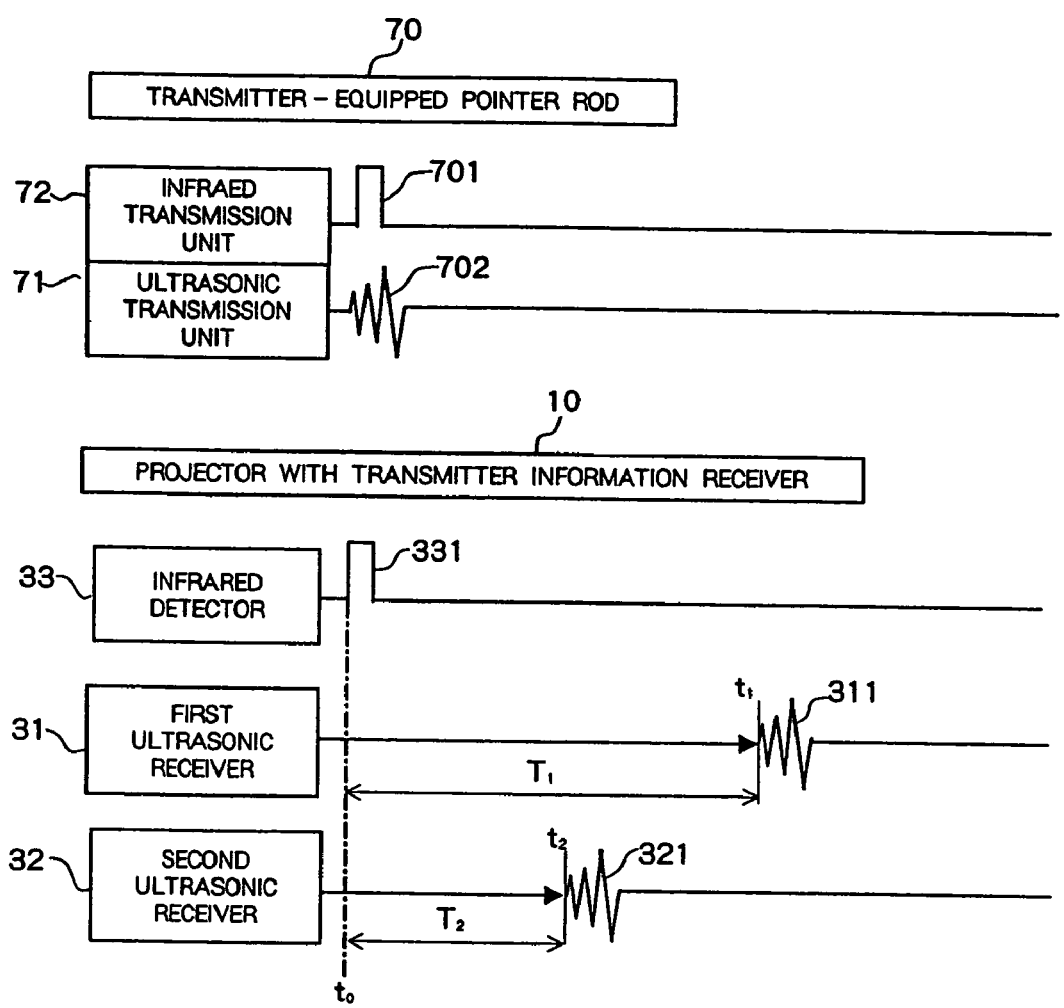
FIG. 5 is a diagram showing the relationship between the transmission and reception of infrared and ultrasonic signals between the projector having the transmitter information receiver and the pointer rod with the transmitter.

When the transmitter of transmitter-equipped pointer rod 70 is applied to a specified position and switch 76 is turned on, infrared transmission unit 72 of transmitter-equipped pointer rod 70 emits infrared trigger pulse 701, and simultaneously ultrasonic transmission unit 71 thereof transmits ultrasonic signal 702, as shown in FIG. 5. Infrared detector 33 of projector 10 with the transmitter information receiver detects infrared trigger pulse 701 as infrared trigger pulse 311, and first ultrasonic receiver 31 and second ultrasonic receiver 32 receive ultrasonic signal 702 as ultrasonic signals 311, 321, respectively.

Infrared detector 33 detects infrared trigger pulse 311 at detection time $t_0$, which is almost free of a time delay from the emission time at which infrared transmission unit 72 emits infrared trigger pulse 701. First ultrasonic receiver 31 receives ultrasonic signal 311 at reception time $t_1$, and second ultrasonic receiver 32 receives ultrasonic signal 321 at reception time $t_2$. These reception times $t_1$, $t_2$ are delayed from the transmission time at which ultrasonic transmission unit 71 transmits ultrasonic signal 702 by respective time delays $T_1$, $T_2$ that are represented by the distances up to ultrasonic reception units 31, 32 as divided by the speed of sound (about 340 m/s). Time delays $T_1$, $T_2$ are determined as the difference between reception times $t_1$, $t_2$ and detection time to $t_0$ provide time information.

Arrangements and operation of time difference analysis distance calculator 41 and transmitter distance information storage 42 will be described below. As described above, ultrasonic transmission unit 71 and infrared transmission unit 72 emit an ultrasonic signal and an infrared pulse, respectively, once in a period. Therefore, the reception time of the infrared pulse and the transmission time of the ultrasonic signal are substantially the same as each other. The difference between the reception time of the ultrasonic signal and the detection time of the infrared pulse represents the travel time of the ultrasonic signal. Using the speed of sound, the distances between ultrasonic transmission unit 71 and ultrasonic reception units 31, 32 can be calculated.

Figure 6:
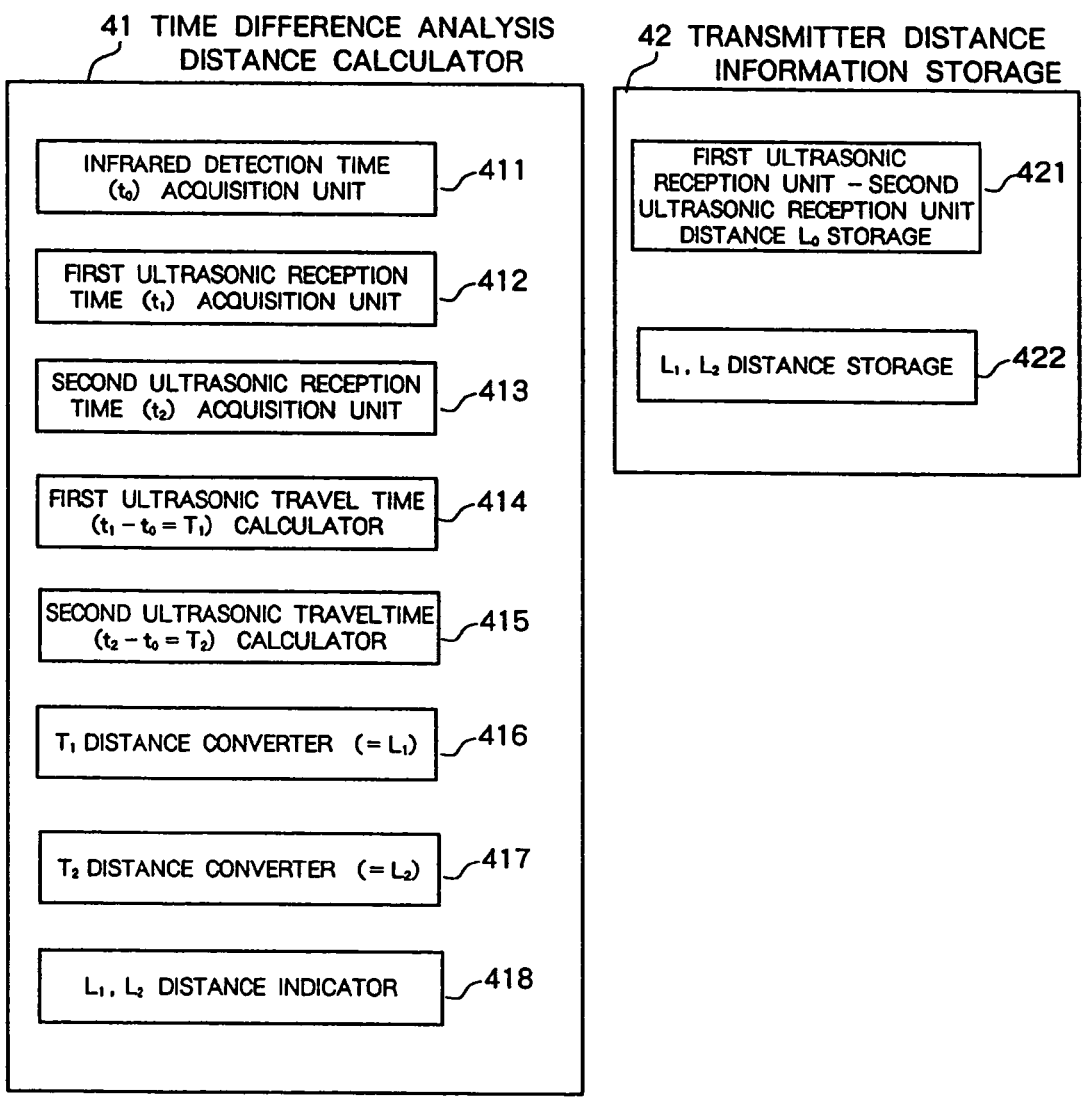
FIG. 6 is a block diagram of a time difference analysis distance calculator and a transmitter distance information storage of the projector according to the embodiment.

As shown in FIG. 6, time difference analysis distance calculator 41 has infrared detection time ($t_0$) acquisition unit 411, first ultrasonic reception time ($t_1$) acquisition unit 412, second ultrasonic reception time ($t_2$) acquisition unit 413, first ultrasonic travel time ($t_1-t_0=T_1$) calculator 414, second ultrasonic travel time ($t_2-t_0=T_2$) calculator 415, $T_1$ distance converter ($=L_1$) 416, $T_2$ distance converter ($=L_2$) 417, and $L_1$, $L_2$ distance indicator 418.

Transmitter distance information storage 42 has first ultrasonic reception unit–second ultrasonic reception unit distance $L_0$ storage 421 and $L_1$, $L_2$ distance storage 422. First ultrasonic reception unit–second ultrasonic reception unit distance $L_0$ storage 421 stores distance $L_0$ between first ultrasonic receiver 31 and second ultrasonic receiver 32 in advance. $L_1$, $L_2$ distance storage 422 stores $L_1$, $L_2$ distances calculated by time difference analysis distance calculator 41 in a given order, e.g., in the order in which they are calculated. The stored $L_1$, $L_2$ distances are read by image correcting information calculation unit 50 using the storage order as an index.

Infrared detection time ($t_0$) acquisition unit 411 acquires detection time $t_0$ at which infrared detector 33 has detected infrared trigger pulse 701 that was emitted, simultaneously with ultrasonic signal 702 transmitted from ultrasonic transmission unit 71, from infrared transmission unit 72 of transmitter-equipped pointer rod 70. First ultrasonic reception time ($t_1$) acquisition unit 412 and second ultrasonic reception time ($t_2$) acquisition unit 413 acquire respective reception times $t_1$, $t_2$ at which first ultrasonic receiver 31 and second ultrasonic receiver 32 have received respective ultrasonic signal 702 that were transmitted, simultaneously with infrared trigger pulse 701 emitted from infrared transmission unit 72, from ultrasonic transmission unit 71 of transmitter-equipped pointer rod 70. First ultrasonic travel time ($t_1-t_0=T_1$) calculator 414 calculates time difference $T_1$ between reception time $t_1$ at first ultrasonic receiver 31 and detection time $t_0$ at infrared detector 33. Second ultrasonic travel time ($t_2-t_0=T_2$) calculator 415 calculates time difference $T_2$ between reception time $t_2$ at second ultrasonic receiver 32 and detection time $t_0$ at infrared detector 33.

$T_1$ distance converter ($=L_1$) 416 converts time difference $T_1$ into distance $L_1$ from ultrasonic transmission unit 71 to first ultrasonic receiver 31, using the data of the speed of sound. $T_2$ distance converter (=$L_2$) 417 converts time difference $T_2$ into distance $L_2$ from ultrasonic transmission unit 71 to second ultrasonic receiver 32, using the data of the speed of sound. $L_1$, $L_2$ distance indicator 418 stores acquired distances $L_1$, $L_2$ into $L_1$, $L_2$ distance storage 422 of transmitter distance information storage 42.

Figure 7:
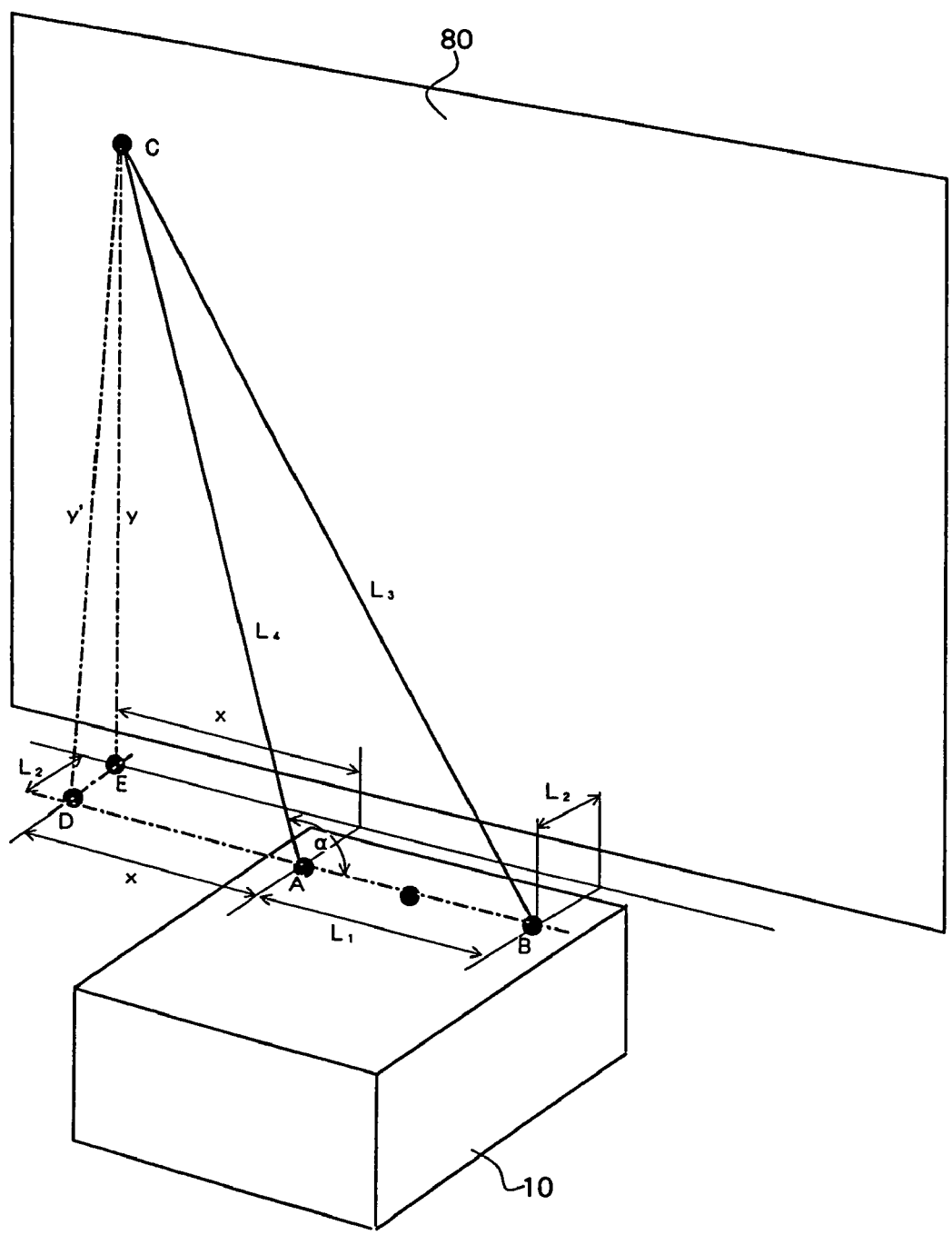
FIG. 7 is a view illustrative of a process performed by an image correcting information calculator for calculating coordinates on the projection surface.

The principles of a process of acquiring the coordinates of a specified point, as performed by image correcting information calculation unit 50 will be described below with reference to FIG. 7. It is assumed in FIG. 7 that second ultrasonic receiver 32 is disposed in position A, first ultrasonic receiver 31 in position B, and ultrasonic transmission unit 71 of transmitter-equipped pointer rod 70 in position C, and that a vertical plane passing through position C and extending perpendicular to projection surface 80 and a line segment passing through positions A, B cross each other at point D, a line extending from point D perpendicular to projection surface 80 and projection surface 80 cross each other at point E, and position C has horizontal and vertical coordinates x, y in a coordinate system having an origin located at position A of second ultrasonic receiver 32.

If the angle between sides CA, AB of triangle CAB is represented by α, then since $$\cos\alpha = (L_4^2 + L_1^2 - L_3^2)/(2L_4 L_1),$$

$$\alpha = \cos^{-1}\{(L_4^2 + L_1^2 - L_3^2)/(2L_4 L_1)\}.$$

Therefore, the angle a is determined from known distances $L_1$, $L_3$, $L_4$.

Because triangle CDA is a right-angled triangle, $$\cos(180° - \alpha) = x/L_4,$$

and therefore horizontal coordinate x is given as $$x = \cos(180° - \alpha) * L_4$$

Horizontal coordinate x is determined by putting determined α into the above equation.

The length y' of side CD of triangle CDA is determined as follows:

$$y' = \sin(180° - \alpha) * L_4$$

Lower reference point distance acquisition unit 52 shown in FIG. 2 determines vertical distance $L_2$ between the straight line interconnecting first ultrasonic receiver 31 and second ultrasonic receiver 32 on the plane which contains the straight line interconnecting first ultrasonic receiver 31 and second ultrasonic receiver 32 and extends parallel to projection optical axis 81. Since it is assumed that the lower reference point is located on the plane containing first ultrasonic receiver 31 and second ultrasonic receiver 32 and extending parallel to projection optical axis 81, y' is determined by moving position C to lower left reference point E and applying the above equation using distances EA, EB when position C is moved to lower left reference point E. y' thus determined represents distance $L_2$.

Inasmuch as triangle CED is also a right-angled triangle and $y^2 = y'^2 - L_2^2$, vertical coordinate y is determined as:

$$y = \sqrt{(y'^2 - L_2^2)}$$

While preferred embodiments of the present invention have been described using specific terms, such description is for illustrative purposes only, and it is to be understood that changes and variations may be made without departing from the spirit or scope of the following claims.

What is claimed is:

1. A projector having a transmitter information receiver, for use in combination with a transmitter having an ultrasonic transmission unit for transmitting an ultrasonic wave and an infrared transmission unit for emitting an infrared radiation, comprising:
   an infrared detector, and a first ultrasonic receiver and a second ultrasonic receiver which are spaced from each other;
   a transmission time information reception unit; and
   an image correcting information calculation unit;
   wherein said transmission time information reception unit calculates a distance between said transmitter and said first ultrasonic receiver and a distance between said transmitter and said second ultrasonic receiver based on reception times of the ultrasonic wave and the infrared radiation transmitted by said transmitter which points to a position on a projection surface, and stores the calculated distances as distance information; and
   wherein when a test pattern made up of a plurality of reference points including a plurality of points near corners of upper and lower edges of the projection surface is projected onto the projection surface, based on said distance information on the projection surface which is acquired by said transmission time information reception unit through said transmitter with respect to the reference points projected onto said projection surface and positional information of desired corrective points for the reference points including points near the corner of the upper edge, said image correcting information calculation unit generates a coordinate transformation table for bringing the coordinates of the reference points near the upper edge into conformity with the coordinates of the desired corrective points corresponding thereto.

2. The projector according to claim 1, wherein the desired corrective points for the reference points are calculated as desired positions on the projection surface based on the coordinates of the reference points near the corners of a lower edge of said test pattern on the projection surface, from the positional relationship between the coordinates of the reference points near the corners of the lower edge of said test pattern and the coordinates of the reference points near corners of an upper lower edge of said test pattern.

3. The projector according to claim 1, wherein the desired corrective points for the reference points are calculated from said distance information on the projection surface of the desired corrective points for the reference points which are acquired by said transmission time information reception unit through said transmitter, and said distance information of the reference points near the corners of the lower edge of the projection surface.

4. The projector according to claim 1, wherein the points near the corners of the upper edge of the projection surface comprise two points near the corners of the upper edge of the projection surface.

5. The projector according to claim 1, further comprising:
   a pointer rod for pointing to the position on the projection surface, said transmitter being mounted on said pointer rod near a tip end thereof.

6. The projector according to claim 1, which comprises a mirror-type projector having a housing having an open structure and a projection mirror for projecting an image, said projection mirror being disposed in said housing.

7. The projector according to claim 1, wherein said first ultrasonic receiver and said second ultrasonic receiver are horizontally spaced from each other on a vertical plane which extends perpendicular to a projection optical axis, to receive the ultrasonic wave transmitted from the ultrasonic transmission unit, and said infrared detector is disposed close to said first ultrasonic receiver and said second ultrasonic receiver, to detect the infrared radiation emitted from the infrared transmission unit;

wherein said transmission time information reception unit comprises:

a time difference analysis distance calculator for calculating ultrasonic wave arrival times from said ultrasonic transmission unit to said first ultrasonic receiver and said second ultrasonic receiver from the differences between a detection time at said infrared detector and the reception times at said first ultrasonic receiver and said second ultrasonic receiver, and calculating distances from said ultrasonic transmission unit to said first ultrasonic receiver and said second ultrasonic receiver from said ultrasonic wave arrival times; and a transmitter distance information storage for storing distance information representing the calculated distances in a predetermined order; and wherein said image correcting information calculation unit comprises:

a test pattern generator for projecting said test pattern made up of the reference points including the points near the corners of the upper and lower edges of the projection surface, onto the projection surface;

a lower reference point distance acquisition unit for calculating deemed vertical distances between a line interconnecting said first ultrasonic receiver and said second ultrasonic receiver and the lower two reference points on the assumption that said lower two reference points are disposed on a plane containing said first ultrasonic receiver and said second ultrasonic receiver and extending parallel to a projection optical axis, from distance information of said lower two reference points which is stored in said transmitter distance information storage and from the distance between said first ultrasonic receiver and said second ultrasonic receiver;

an upper reference point coordinate acquisition unit for calculating vertical and horizontal coordinates of the upper reference points on a plane perpendicular to said projection optical axis from the distance between said first ultrasonic receiver and said second ultrasonic receiver and from distance information of said upper reference points which is stored in said transmitter distance information storage, on the assumption that vertical distances between a plane containing said first ultrasonic receiver and said second ultrasonic receiver and extending perpendicular to said projection optical axis and to the reference points near the upper edge of said projection surface are substantially equal to said deemed vertical distances;

an upper corrective point coordinate calculator for calculating coordinate of desired corrective points for said upper reference points according to a predetermined process; and a coordinate transformation table generator for generating said coordinate transformation table for bringing the coordinates of said upper reference points which are calculated by said upper reference point coordinate acquisition unit into conformity with the coordinates of the desired corrective points for said upper reference points which are calculated by said upper corrective point coordinate calculator.

8. The projector according to claim 7, wherein said upper corrective point coordinate calculator assumes that the vertical distances between the plane containing said first ultrasonic receiver and said second ultrasonic receiver and extending perpendicular to said projection optical axis and to the reference points near the upper edge of said projection surface are substantially equal to said deemed vertical distances, calculates coordinates of said lower two reference points on the assumption that said lower two reference points are disposed on the plane containing said first ultrasonic receiver and said second ultrasonic receiver and extending parallel to said projection optical axis, from the distance information of said lower two reference points which is stored in said transmitter distance information storage and from the distance between said first ultrasonic receiver and said second ultrasonic receiver, and calculates the coordinates of upper ones of the reference points of the test pattern as the upper ones of said desired corrective points on the assumption that the coordinates of said lower two reference points correspond to the coordinates of the lower two of the reference points of the test pattern.

9. The projector according to claim 7, wherein said upper corrective point coordinate calculator assumes that the vertical distances between the plane containing said first ultrasonic receiver and said second ultrasonic receiver and extending perpendicular to said projection optical axis and to the reference points near the upper edge of said projection surface are substantially equal to said deemed vertical distances, and calculates vertical and horizontal coordinates of said desired corrective points on the plane perpendicular to said projection optical axis from the distance between said first ultrasonic receiver and said second ultrasonic receiver and from distance information, stored in said transmitter distance information storage, of the desired corrective points for the upper reference points which are pointed to by a pointer rod having said transmitter.

10. A method of correcting a distortion of an image projected by a projector having a transmitter information receiver, comprising the steps of:

projecting a test pattern made up of a plurality of reference points including a plurality of points near the corners of upper and lower edges of a projection surface, from a test pattern generator onto the projection surface;

pointing to the reference points of the test pattern projected onto the projection surface in a predetermined order with a transmitter having an ultrasonic transmission unit for transmitting an ultrasonic wave and with an infrared transmission unit for emitting an infrared radiation, to simultaneously transmit ultrasonic and infrared pulses, representing time information, from said ultrasonic transmission unit and said infrared transmission unit;

receiving the ultrasonic and infrared pulses with a first ultrasonic receiver and a second ultrasonic receiver and an infrared detector of said projector, acquiring time differences between reception times of said ultrasonic pulses and a reception time of said infrared pulse, and calculating a distance between said ultrasonic transmission unit and said first ultrasonic receiver and a distance between said ultrasonic transmission unit and said second ultrasonic receiver from the acquired time differences;

storing the calculated distances in a transmitter distance information storage in a predetermined order;

controlling a lower reference point distance acquisition unit to calculate deemed vertical distances between a line interconnecting said first ultrasonic receiver and said second ultrasonic receiver and the lower two reference points on the assumption that said lower two reference points are disposed on a plane containing said first ultrasonic receiver and said second ultrasonic receiver and extending parallel to a projection optical axis, from distance information of said lower two reference points which is stored in said transmitter distance information storage and from the distance between said first ultrasonic receiver and said second ultrasonic receiver;

controlling an upper reference point coordinate acquisition unit to calculate vertical and horizontal coordinates of upper ones of the reference points on a plane perpendicular to said projection optical axis from the distance between said first ultrasonic receiver and said second ultrasonic receiver and from distance information of said upper reference points which is stored in said transmitter distance information storage, on the assumption that vertical distances between a plane containing said first ultrasonic receiver and said second ultrasonic receiver and extending perpendicular to said projection optical axis and to the reference points near the upper edge of said projection surface are substantially equal to said deemed vertical distances;

controlling an upper corrective point coordinate calculator to assume that the vertical distances between the plane containing said first ultrasonic receiver and said second ultrasonic receiver and extending perpendicular to said projection optical axis and to the reference points near the upper edge of said projection surface are substantially equal to said deemed vertical distances, to calculate coordinates of said lower two reference points on the assumption that said lower two reference points are disposed on the plane containing said first ultrasonic receiver and said second ultrasonic receiver and extending parallel to said projection optical axis, from the distance information of said lower two reference points which is stored in said transmitter distance information storage and from the distance between said first ultrasonic receiver and said second ultrasonic receiver, and to calculate the coordinates of upper one of the reference points of the test pattern as the upper ones of said desired corrective points on the assumption that the coordinates of said lower two reference points correspond to the coordinates of the lower two of the reference points of the test pattern;

controlling a coordinate transformation table generator to generate a coordinate transformation table for bringing the coordinates of said upper reference points which are calculated by said upper reference point coordinate acquisition unit into conformity with the coordinates of the desired corrective points for said upper reference points which are calculated by said upper corrective point coordinate calculator; and controlling an image controller to correct an input original image based on said coordinate transformation table and to project the corrected image from a projecting device onto the projecting surface.

11. A method of correcting a distortion of an image projected by a projector having a transmitter information receiver, comprising the steps of:

projecting a test pattern made up of a plurality of reference points including a plurality of points near the corners of upper and lower edges of a projection surface, from a test pattern generator onto the projection surface;

pointing to the positions of the reference points of the test pattern projected onto the projection surface and to the positions of desired corrective points for upper ones of the reference points in a predetermined order with a transmitter having an ultrasonic transmission unit for transmitting an ultrasonic wave and with an infrared transmission unit for emitting an infrared radiation, to simultaneously transmit ultrasonic and infrared pulses, representing time information, from said ultrasonic transmission unit and said infrared transmission unit;

receiving the ultrasonic and infrared pulses with a first ultrasonic receiver and a second ultrasonic receiver and an infrared detector of said projector, acquiring time differences between reception times of said ultrasonic pulses and a reception time of said infrared pulse, and calculating a distance between said ultrasonic transmission unit and said first ultrasonic receiver and a distance between said ultrasonic transmission unit and said second ultrasonic receiver from the acquired time differences;

storing the calculated distances in a transmitter distance information storage in a predetermined order;

controlling a lower reference point distance acquisition unit to calculate deemed vertical distances between a line interconnecting said first ultrasonic receiver and said second ultrasonic receiver and the lower two reference points on the assumption that said lower two reference points are disposed on a plane containing said first ultrasonic receiver and said second ultrasonic receiver and extending parallel to a projection optical axis, from distance information of said lower two reference points which is stored in said transmitter distance information storage and from the distance between said first ultrasonic receiver and said second ultrasonic receiver;

controlling an upper reference point coordinate acquisition unit to calculate vertical and horizontal coordinates of the upper ones of the reference points on a plane perpendicular to said projection optical axis from the distance between said first ultrasonic receiver and said second ultrasonic receiver and from distance information of said upper reference points which is stored in said transmitter distance information storage, on the assumption that vertical distances between a plane containing said first ultrasonic receiver and said second ultrasonic receiver and extending perpendicular to said projection optical axis and to the reference points near the upper edge of said projection surface are substantially equal to said deemed vertical distances;

controlling an upper corrective point coordinate calculator to assume that the vertical distances between the plane containing said first ultrasonic receiver and said second ultrasonic receiver and extending perpendicular to said projection optical axis and to the reference points near the upper edge of said projection surface are substantially equal to said deemed vertical distances, and to calculate vertical and horizontal coordinates of said desired corrective points on the plane perpendicular to said projection optical axis from the distance between said first ultrasonic receiver and said second ultrasonic receiver and distance information, stored in said transmitter distance information storage, of the desired corrective points for the upper reference points;

controlling a coordinate transformation table generator to generate a coordinate transformation table for bringing the coordinates of said upper reference points which are calculated by said upper reference point coordinate acquisition unit into conformity with the coordinates of the desired corrective points for said upper reference points which are calculated by said upper corrective point coordinate calculator; and controlling an image controller to correct an input original image based on said coordinate transformation table and to project the corrected image from a projecting device onto the projecting surface.

* * * * *